(No Model.)
J. A. HAGAN.
CAR WHEEL.
No. 294,995. Patented Mar. 11, 1884.
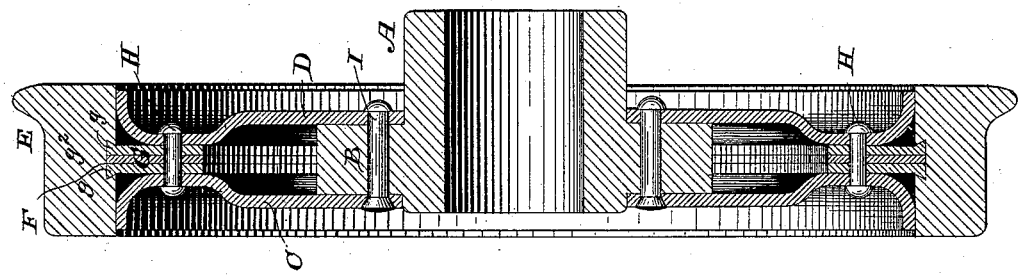
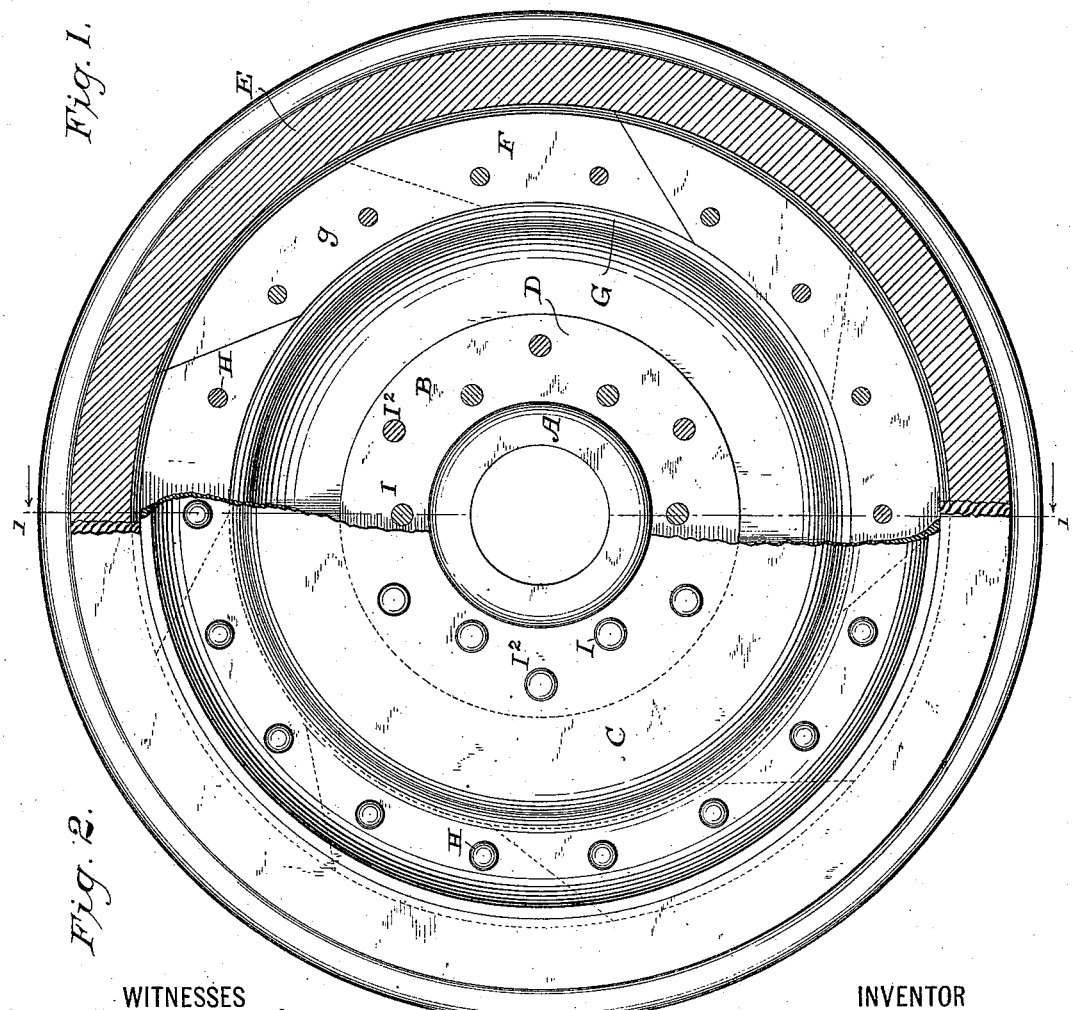
Fig. 1.
Fig. 2.
WITNESSES
Wm A. Skinkle
Alfred E. Newman
INVENTOR
John A. Hagan.
By his Attorneys
Baldwin, Hopkins, & Peyton.

UNITED STATES PATENT OFFICE.

JOHN A. HAGAN, OF THREE RIVERS, MICH., ASSIGNOR, BY MESNE ASSIGN-MENTS, TO THE HAGAN STEEL CAR WHEEL COMPANY, OF SAME PLACE.

CAR-WHEEL.

SPECIFICATION forming part of Letters Patent No. 294,995, dated March 11, 1884.

Application filed August 21, 1883. (No model.)

*To all whom it may concern:*

Be it known that I, JOHN A. HAGAN, of Three Rivers, in the county of St. Joseph and State of Michigan, have invented certain new and useful Improvements in Car-Wheels, of which the following is a specification, reference being had to the accompanying drawings, in which—

Figure 1 is a radial or diametrical section of my improved car-wheel; and Fig. 2 is a side elevation of the same, partly in section.

My invention relates to that class of car-wheels in which the tire and body of the wheel are of different materials; and has for its objects, first, securely attaching the tire to the wheel-body in a convenient and inexpensive manner; second, constructing the wheel so that it will be to a proper extent elastic in use; and, third, providing for the expansion of the axle and hub (caused by hot journals) without causing a dangerous strain on the wheel-body or tire.

For the purpose of securely attaching the tire to the body of the wheel, the tire is made with an internal flange or ring, which method of construction, I am aware, is not broadly new; but when this internal ring is made integral with the tire its cost is greatly increased on account of the difficulty of hammering or rolling to the required shape. Again, when it is made of a separate continuous piece, the difficulty and cost of construction and union with the tire are very considerable, and the result is not satisfactory. Therefore I make my internal ring in curved sections, and dovetail it and key it into an annular groove in the inner face of the tire, which I find is an improvement of great practical importance. In my improved wheel the only increased cost over a plain tire is for the internal ring as a separate structure, and for the dovetail annular groove in the tire in which it is held, and the very trifling cost of securing the ring into the groove in the tire. In point of safety the sectional ring is greatly superior to the solid ring or flange, because steel tires almost invariably fracture laterally, and the break is liable to extend through the depending ring also. With the built-up sectional ring this cannot occur, and the fractured piece will be held securely by its fitting the dovetail ring. The required elasticity and provision for expansion of the axle and hub are obtained by the shape and material of the side plates or disks which form the body of the wheel.

My improved wheel consists of a hub, A, preferably of wrought-iron, having an annular projection, B, forming shoulders for the reception of the side plates C and D. The hub may, however, be of malleable cast-iron, or of steel, or other metal. The side plates are preferably of sheet-iron of suitable thickness, or of steel. The forms or contours of the side plates may be varied; but I prefer the forms shown. They are similar circular disks with flanged rims, and, viewed from the exterior of the wheel, raised central portions, substantially as illustrated.

E indicates the tire, which is preferably of steel, and has an annular dovetail groove, F, in its inner face, from which projects inwardly a suitable distance a safety-ring, G. This ring is preferably of wrought-iron in sections or segments, and made to fit tightly into the dovetail groove of the tire. It is composed of two sectional side pieces, $g$, with dovetail finish, as illustrated, so as to fit the dovetail of the tire, and a sectional center piece or key, $g^2$, which serves to hold them firmly in place. In building up this ring in place in the tire, the sections should be made to break joints.

H indicates bolts or rivets passing through the side plates and the ring, and I $I^2$ bolts or rivets passing through the side plates and the annular projection of the hub.

The manner of manufacturing my improved car-wheel is as follows: The hub and tire are formed by forging or casting in any usual manner, and the dovetail groove in the inner face of the tire is turned or otherwise formed, and the remaining portion of the inner surface of the tire is also made true by turning or otherwise. The ring is then formed in the dovetail groove of the tire of suitable pieces, which have preferably been rolled to the required section and bent to the required circle, the holes for the bolts being either punched or drilled. The circular pieces forming the sides of the ring, not having their ends welded or otherwise joined in the groove of the tire, but merely being in contact, may be inserted in place by overlapping their ends sufficiently, and then springing the circular pieces into place in the dovetail groove in the tire. The central piece or key is then afterward put in in a similar manner, which forces the side pieces to fit snugly in the dovetail portions of the groove. The ends of the key may be cut tangentially, if desired, or in the line of a suitable curve, so that the key may be made to fill the entire space in the tire-groove between the side pieces, or the ring may be put in in segments, if desired. The above is the simpler and the preferred method of building up the ring within the groove of the tire; but there are other methods.

The tangential lines in Fig. 2 indicate how in each set of sections forming one-third of a ring there may be one piece cut tangentially at both ends, and the adjoining pieces may be correspondingly cut at one end to enable the ring to be readily built up. Each plate or third of the ring may be composed of two or more segmental pieces, as may be desired, and the ring may be built up in place in the way suggested, or otherwise, as preferred. The hub having been properly bored and turned, or otherwise made true, and the bolt-holes drilled, the hub is next centered with the tire, and the side plates having been formed of the proper size with bolt-holes corresponding to those in the ring and hub, they are forced by hydraulic pressure or otherwise into place, so as to bear by their inner edges and outer bearing-surfaces firmly against the tire and hub, as illustrated. Their flanged rims form a more extended bearing-surface for the tire than would their edges alone, and with the form of their central portion give them, in connection with the tire, the elasticity required in a car-wheel of the best type. Side plates or disks of this construction may also be used to advantage where the internal ring or depending flange is integral with the tire. Finally, the plates are bolted to the ring and to the hub, which completes the wheel. The ring will hold all parts of the tire together in case of breaking or cracking of a small piece or pieces of the tire when the wheel is in use, and thus serious accidents that sometimes happen from such causes will be averted.

Having thus described my invention, what I claim as new, and desire to secure by Letters Patent, is—

1. The combination, with a tire for a car-wheel having a dovetail annular groove in its inner face, of a sectional dovetail ring secured in such groove, substantially as set forth.

2. The combination, with a hub of a car-wheel and its tire provided with a sectional dovetail ring, of side plates or disks pressed between the hub and tire and bolted to the hub and ring, substantially as set forth.

3. In a car-wheel, the combination, with a hub and tire provided with a sectional dovetail ring, of side plates or disks having flanged rims, and bolted to the hub and ring, substantially as set forth.

4. In a car-wheel, the combination, with a hub and a tire provided with an internal sectional dovetail ring, of side plates or disks with rims curving outwardly from the depending flange, and bearing against the tire, and bolted to the ring and hub, substantially as set forth.

In testimony whereof I have hereunto subscribed my name this 15th day of August, A. D. 1883.

JOHN A. HAGAN.

Witnesses:
SAM L. WHITESIDE,
O. P. SLOTE.